United States Patent [19]
Watanabe

[11] Patent Number: 5,787,574
[45] Date of Patent: Aug. 4, 1998

[54] METHOD FOR PROCESSING THE END OF A SHIELDED CABLE

[75] Inventor: Kunihiko Watanabe, Yokkaichi, Japan

[73] Assignee: Sumitomo Wiring Systems, Ltd., Japan

[21] Appl. No.: 658,471

[22] Filed: Jun. 5, 1996

[30] Foreign Application Priority Data

Jun. 7, 1995 [JP] Japan .................................. 7-140819

[51] Int. Cl.$^6$ .................................................. H01B 13/20
[52] U.S. Cl. ........................... 29/828; 81/9.51; 174/28
[58] Field of Search ........................ 29/825; 81/9.51, 81/828; 174/28

[56] References Cited

U.S. PATENT DOCUMENTS

| | | | |
|---|---|---|---|
| 3,621,560 | 11/1971 | Le Bright | 29/828 |
| 4,719,697 | 1/1988 | Schwartzman et al. | 81/9.51 X |
| 4,763,410 | 8/1988 | Schwartzman | 29/828 |
| 4,766,669 | 8/1988 | Schwartzman | 29/828 |
| 4,860,441 | 8/1989 | Pierpoint | 81/9.51 X |
| 4,916,811 | 4/1990 | Uehara et al. | 81/9.51 X |
| 5,367,767 | 11/1994 | Deuel et al. | 29/828 X |

FOREIGN PATENT DOCUMENTS

| | | |
|---|---|---|
| 3925850 | 7/1991 | Germany . |
| 4212805 | 2/1993 | Germany . |
| 6481608 | 3/1989 | Japan . |
| 1177810 | 7/1989 | Japan . |
| 3-226212 | 10/1991 | Japan .................................. 81/9.51 |

*Primary Examiner*—Carl J. Arbes
*Attorney, Agent, or Firm*—Jordan B. Bierman; Bierman, Muserlian and Lucas

[57] ABSTRACT

Drain wires of a shielded cable are exposed, untwisted, and expanded into the approximate shape of a sphere. Pressurized gas is applied to the expanded drain wires. Simultaneously, the cores are bent to bow upstream of the gas flow, whereas the drain wires, being relatively flexible, bend downstream thereof. Even if low pressure gas is used, the cores and the drain wires can be sufficiently separated. This permits the insertion of a tool or the like between the drain wires and the cores and, therefore, facilitates automation of the process.

11 Claims, 5 Drawing Sheets

METHOD FOR PROCESSING THE END OF A SHIELDED CABLE

This Application claims the benefit of the priority of Japanese Application 7-140819, filed Jun. 7, 1995.

The present Invention relates to a method for processing an end of a shielded cable, more particularly a shielded cable of the transverse wind type.

BACKGROUND OF THE INVENTION

In general, a shielded cable comprises a plurality of cores having a plurality of drain wires wrapped therearound covered by an insulating sheath. A shielded cable of transverse wind type is one in which linearly extending drain wires cover the cores and are twisted in one direction along the circumference thereof. A variety of methods and apparatuses for stripping the end of the sheath of such a shielded cable and separating the cores from the drain wires are known.

For example, Japanese Unexamined Patent Publication No. 1-177810 discloses a method according to which the sheath of the shielded cable is peeled to expose the drain wires, and the cores are separated therefrom by brushing the exposed drain wires. However, according to this method, a brush needs to be brought into contact with the surfaces of the drain wires many times to properly separate them from the cores. This may result in scratching the surfaces of the drain wires and/or peeling the plating thereon.

In view of the above problems, there have been proposed methods separating the drain wires and cores using pressurized air to avoid scratching the surfaces of the drain wires. These methods are disclosed, e.g. in Japanese Unexamined Patent Publications No. 64-81608 and 64-26316. However, this separation cannot be adequately accomplished only by application of pressurized air; hence, subsequent treatment steps become difficult. This problem is particularly troublesome when the end of the shielded cable to be processed is long. In order to avoid this problem, consideration has been given to applying high pressure air for this purpose. However, this undesirably increases the size and cost of the apparatus for supplying the pressurized air.

SUMMARY OF THE INVENTION

In view of the above problems, it is an object of the Invention to provide a method for processing an end of a shielded cable whereby drain wires and cores can be easily and securely separated using a pressurized air with simple equipments, thereby permitting easy automatic processing.

The present Invention is directed to a method for processing the end of a shielded cable wherein the sheath is cut near the end to form a scrap sheath, adjacent the end, and a base sheath, remote from the end. The scrap sheath is slid axially away from the base sheath to expose the drain wires and the cores. The exposed cable portion is bent so that the base sheath and the scrap sheath form an angle other than 0° and 180°. A stream of compressed gas (preferably air) is applied to the exposed portion in a direction which is transverse to the axis thereof. This causes the drain wires, which are relatively fine and light, to be separated from the cores, which are relatively firm and heavy.

In a preferred form of the device, after the portion of the cable has been exposed, the end is rotated in a direction opposite to the twist of the drain wires. As a result, they are loosened and no longer tightly wound around the cores. Thus, when the exposed cable portion is bent, a substantial space is created between the cores and the bundle of drain wires which have been blown away from the cores by the gas stream.

Loosening the braid of the exposed drain wires causes them to expand into the approximate shape of a sphere before the pressurized gas is applied. The braid loosening step is advantageously performed by rotating one of the portions of the shielded cable near the exposed portion, preferably the scrap sheath, around its longitudinal axis while restraining the other.

The pressurized gas is applied to the expanded drain wires, and the cores are bent so as to project upstream of the flow thereof. The pressurized gas bends the drain wires downstream of the flow; as a result, the cores and drain wires are bent in opposite directions, thereby defining a large space therebetween.

Thus, the drain wires are separated from the cores by the pressurized gas while the cores are bent. Accordingly, the drain wires can be easily separated from the cores, even if relatively low pressure is used. Further, since the drain wires and the cores are separated while defining a large space therebetween, a tool or device can be easily inserted between the drain wires and the cores. Hence, the drain wires and the cores can be easily and reliably separated with simple equipment, and such a separating step enables easy automatic processing.

According to a further preferred embodiment, the drain wires can be expanded and separated from the cores while the scrap sheath remains on the cores. As a result, the respective steps can be performed while the scrap sheath is gripped, which facilitates the automation of the process.

It is also desirable to heat the end of the scrap sheath while the cores are being separated from the drain wires and are pulled out of the end of the scrap sheath. Accordingly, the cut sheath softens, thereby weakening the grip of the scrap sheath on the cores, and facilitating the withdrawal of the cores from the scrap sheath.

An especially useful method of pulling the cores out of the end of the scrap sheath is by holding the cores separated from the drain wires by a pair of rollers, at least one of which is driven. The cores separated from the drain wires are gripped by the pair of rollers and, by the rotation thereof, are smoothly withdrawn from the scrap sheath, regardless of the length of the scrap sheath. According to a further preferred embodiment, the drain wires may be twisted by rotating the scrap sheath during separation. Thus, since the cores are pulled out at the same time the drain wires are braided, the end of the shielded cable can be more rapidly processed.

These and other objects, features and advantages of the present Invention will become more apparent from the following detailed description. In the accompanying drawings, constituting a part hereof and in which like reference characters indicate like parts, FIG. 1 is a schematic view showing the drain wires being exposed;

Figure 1:
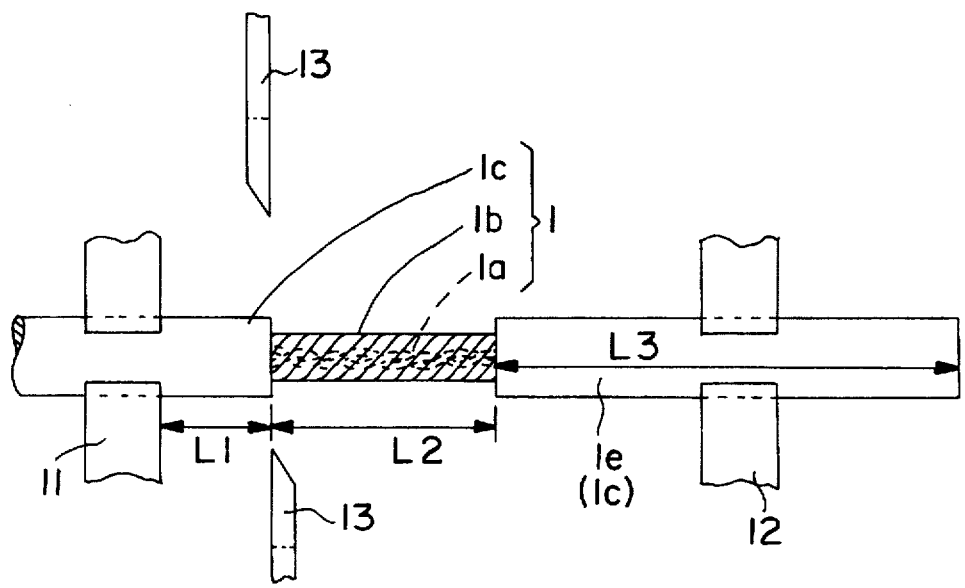

Shielded cable 1, of transverse wind type, includes two braided cores 1a, drain wires 1b covering cores 1a, and sheath 1c surrounding drain wires 1b. Drain wires 1b are twisted in one direction around the outer surface of cores 1a.

Fixed clamp 11 grips the base of shielded cable 1 in a predetermined position when the sheath is to be cut adjacent the end thereof. Clamp 12 is movable toward and away from clamp 11, rotatable circumferentially of shielded cable 1, and in a direction so as to bend the shielded cable. Movable clamp 12 may be replaced, for example, by an automatic processing apparatus or a hand tool such as pliers or pincers.

The base of shielded cable 1 is gripped by fixed clamp 11, and the end thereof is gripped by movable clamp 12. Then, tension is applied to the shielded cable. In this condition, a pair of opposed V-shaped stripping blades 13 are moved toward each other to cut sheath 1c. Thereafter, movable clamp 12 is moved away from fixed clamp 11 to slide scrap sheath 1e away from base sheath 1c, thereby exposing drain wires 1b. A stripping device as disclosed in Japanese Unexamined Patent Publication 64-26316 or cutters may be used for this purpose. As shown in FIGS. 1 to 5, scrap sheath 1e remains on the end of shielded cable 1 during most of the processing steps. In other words, scrap sheath 1e is not separated from shielded cable 1. It should be appreciated that the sheath 1c may be cut before shielded cable 1 is gripped by clamps 11 and 12.

If L1 is the distance between the end surface of fixed clamp 11 facing blades 13, and if L2 is the distance over which drain wires 1b are exposed, L1 and L2 are, for example, 10 mm and 30 mm, respectively. Further, length L3 of scrap sheath 1e is usefully between 50 and 200 mm, depending upon the product to be manufactured.

Figure 2:
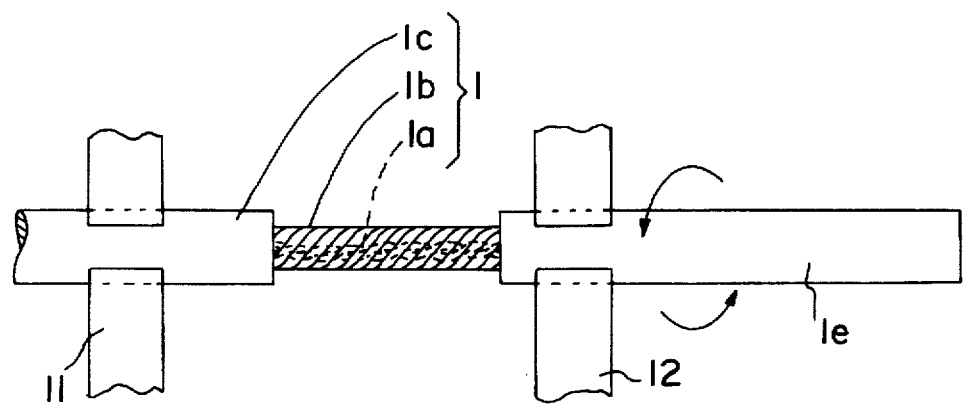
FIG. 2 is a schematic view indicating the expansion of the drain wires.
Figure 3:
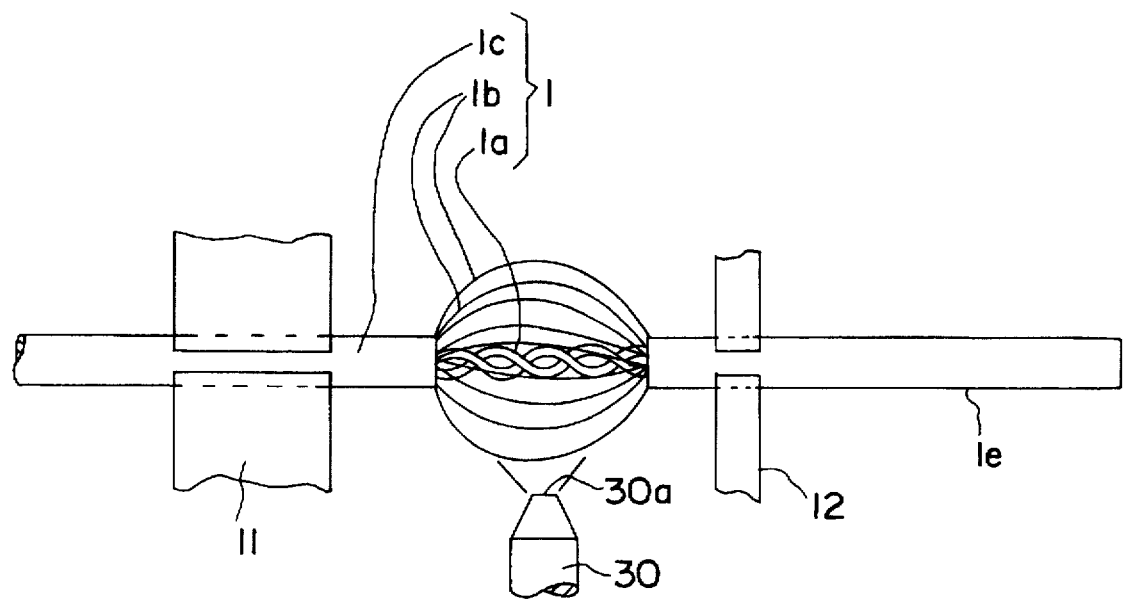
FIGS. 3 to 6 are schematic views showing the various steps in the separation of the drain wires from the cores.

With reference to FIG. 2, drain wires 1b of shielded cable 1 are loosened and expanded by rotating the movable clamp 12 in a direction opposite to the twisted direction of the drain wires 1b as shown by the arrows. The number of rotations is not critical, and will depend upon the particular shielded cable. As a result of the foregoing expanding step, drain wires 1b expand and bend outwards into the approximate shape of a sphere, as shown in FIG. 3.

Figure 4:
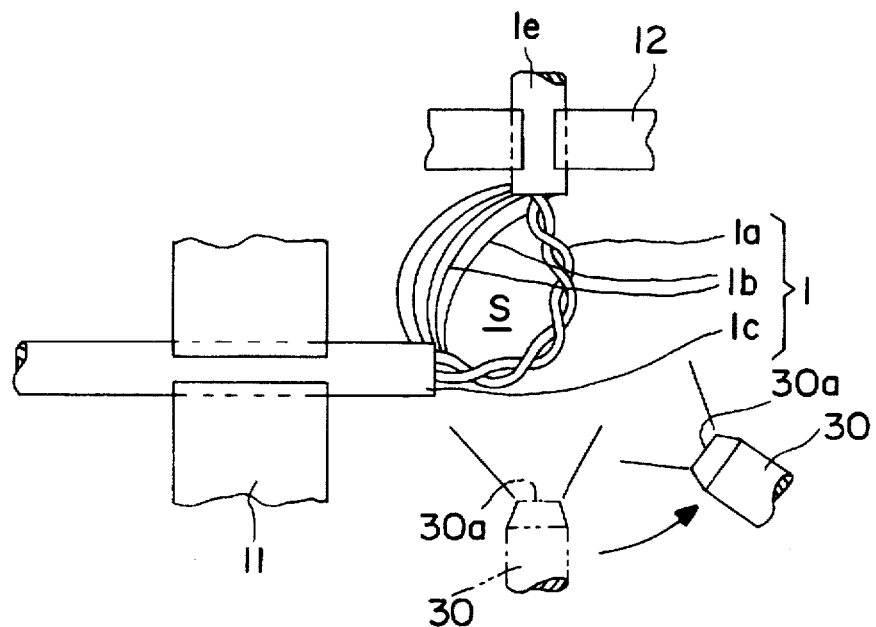

Next, expanded drain wires 1b are separated from cores 1a by applying pressurized gas. Air nozzle 30 is directed at about the middle of expanded drain wires 1b; this step can be manually performed, as by an air gun. While the pressurized air is applied, cores 1a are bent so as to project upstream of the flow of pressurized air, i.e. toward discharging port 30a of air nozzle 30, as shown in FIG. 4. Cores 1a can be easily bent by, e.g. moving the movable clamping member 12 so that scrap sheath 1e forms an angle other than 0° or 180° with base sheath 1c; in particular, up to or about 90° has been found suitable.

By moving movable clamp 12 as above, cores 1a, being relatively rigid, are bent and project toward air discharging port 30a of air nozzle 30. On the other hand, being substantially more flexible than cores 1a, drain wires 1b are blown away from the cores by pressurized air from nozzle 30 so as to project in a direction opposite from cores 1a, i.e. toward a downstream side of the flow of the pressurized air. This is clearly shown in FIG. 4. As a result, cores 1a and drain wires 1b are separated and define large space S therebetween. Air nozzle 30 is preferably displaceably held by a gripping mechanism (not shown). While cores 1a are bent, air nozzle 30 is rotated from the position indicated by phantom lines to the position indicated by solid lines so that it is always directed to the middle of exposed drain wires 1b.

Figure 5:
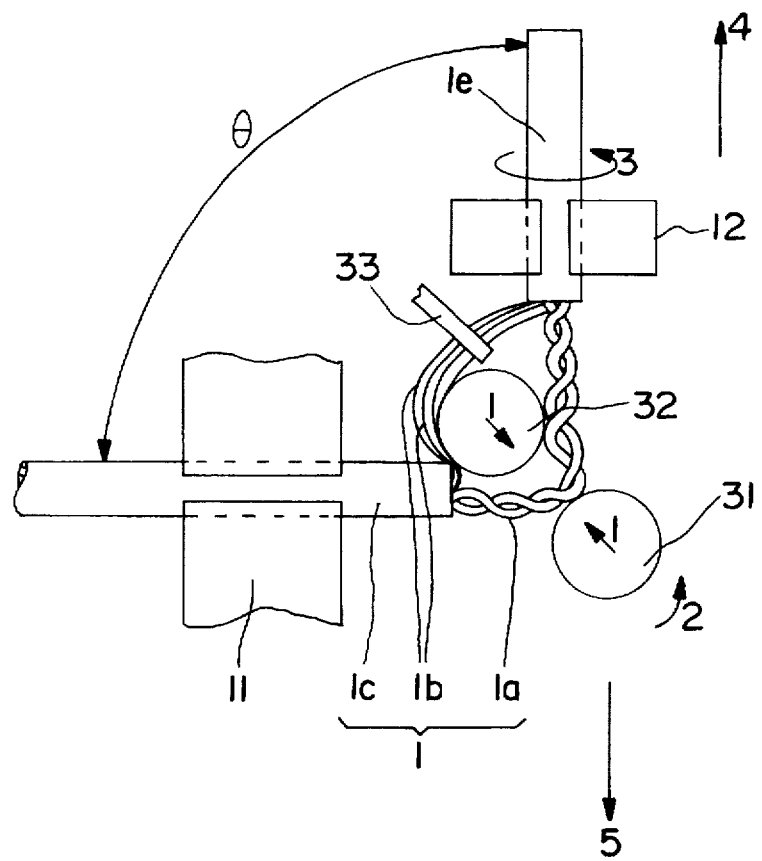
Figure 6:
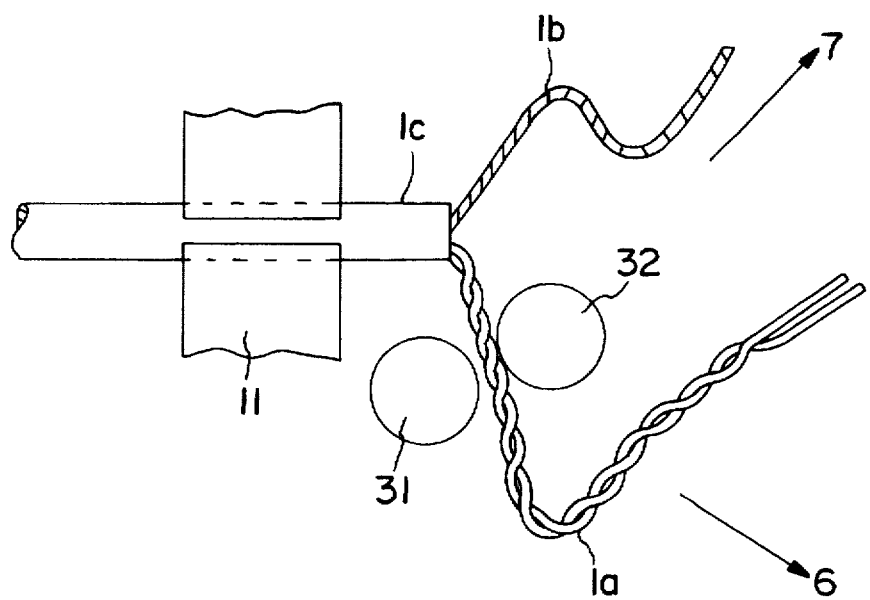

With reference to FIGS. 5, and 6 drive roller 31 is rotated by an external source (not shown), and driven roller 32 transmits the driving force of drive roller 31 to cores 1a by gripping cores 1a in cooperation with drive roller 31. Advantageously, the rollers are tapered and made of resin. After insertion into space S, driven roller 32 and drive roller 31 are moved toward each other as indicated by arrows (1), thereby tightly gripping cores 1a. Then, by rotating drive roller 31 counterclockwise as indicated by arrow (2), cores 1a are easily withdrawn from scrap sheath 1e. By rotating movable clamp 12 in the direction indicated by arrow (3) and moving it in the direction indicated by arrow (4), drain wires 1b are braided at the same time they are pulled out.

Thereafter, rollers 31, 32 are moved away from scrap sheath 1e as a unit in the direction indicated by arrow (5) while drive roller 31 is rotating. At the same time, it is preferred to heat scrap sheath 1e by blowing hot air thereon; upon being heated, the scrap sheath softens, thereby weakening its grip on cores 1a.

After being withdrawn from scrap sheath 1e, cores 1a are pulled in the direction indicated by an arrow (6) in FIG. 6, by rollers 31, 32. Drain wires 1b are pulled in the direction indicated by arrow (7) using a tool (not shown). As a result, cores 1a and drain wires 1b are straightened and braided while being separated from each other.

Figure 7:
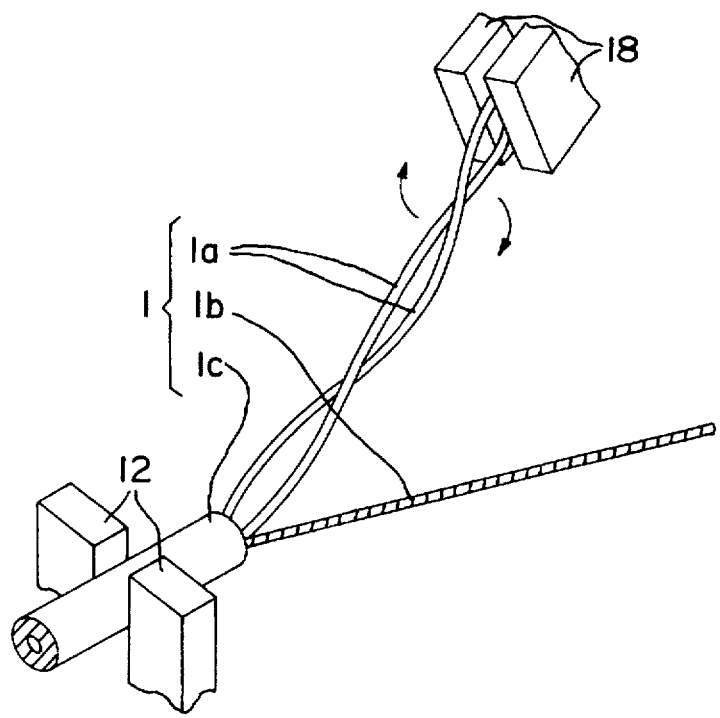
FIG. 7 is a perspective view showing untwisting of the core after withdrawal from the scrap sheath and twisting of the drain wires.

With reference to FIG. 7, separated cores 1a are loosened and untwisted while the ends thereof are gripped by core clamp 18. Alternatively, movable clamp 12 may be used to grip the ends of cores 1a to unwind them.

Figure 8:
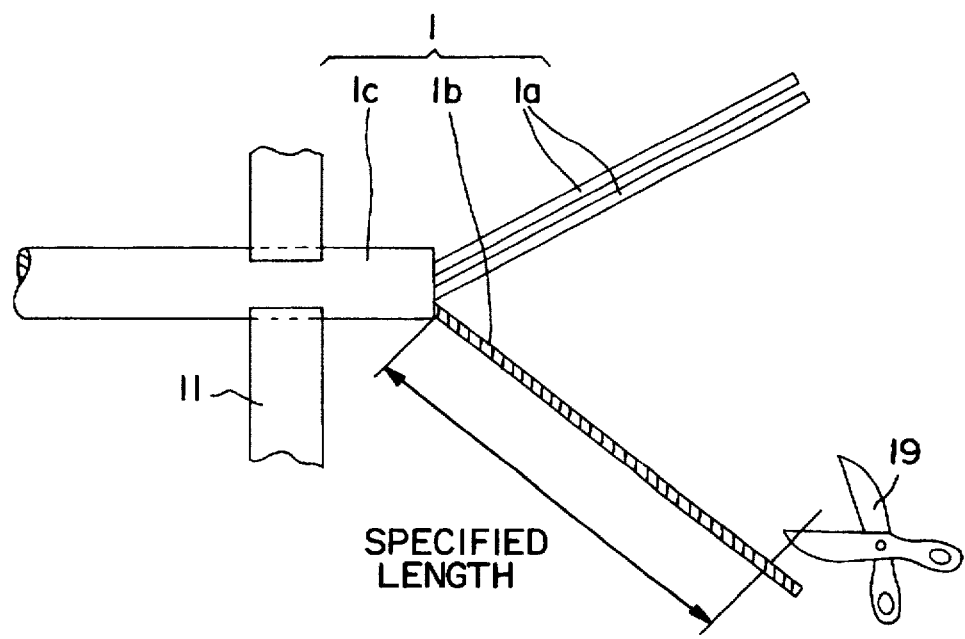
FIG. 8 is a schematic view showing the drain wires being cut by a pair of scissors.
Figure 9:
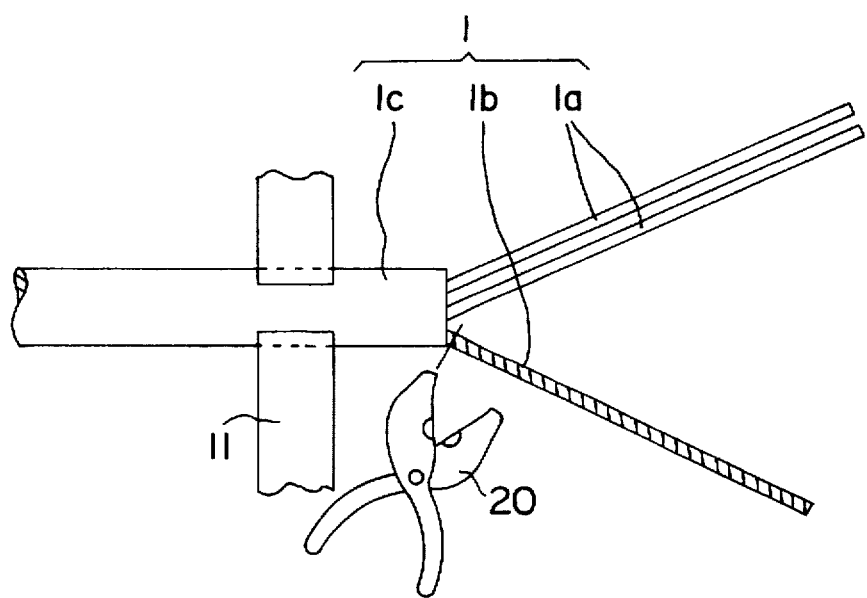
FIG. 9 is a view similar to that of FIG. 8, wherein a pair of pliers is used to cut the drain wires.

With reference to FIGS. 8 and 9, braided drain wires 1b are cut to a desired measured length as needed (FIG. 8) or cut at the end of base sheath 1c (FIG. 9), thus completing the process. To cut drain wires 1b, scissors 19 for cutting metal wires, as shown in FIG. 8, or pliers 20 as shown in FIG. 9, may be used.

Thus, drain wires 1b are separated from cores 1a by applying pressurized air while cores 1a are bent. Accordingly, drain wires 1b can be easily separated from cores 1a, even if relatively low pressure air is used. Further, since drain wires 1b and cores 1a are separated while defining large space S therebetween, rollers 31, 32 or another tool or device can be easily inserted between drain wires 1a and cores 1a, thereby ensuring easy automatic processing.

While only a limited number of embodiments of the present Invention have been expressly disclosed, such modifications as would suggest themselves to the person of ordinary skill may be made without departing from the scope or spirit thereof. For example, although at least one of the rollers 31, 32 described in the foregoing embodiment is a drive roller, both rollers may be drive rollers. Thus, the present Invention is to be broadly construed, and not to be limited except by the character of the claims appended hereto.

I claim:

1. A method for processing an end of a shielded cable, said cable comprising at least one core, a plurality of drain wires twisted in a first direction around said core, and a cable sheath surrounding said drain wires, said method comprising cutting said cable sheath to form a scrap sheath adjacent said end and a base sheath remote from said end;

exposing said drain wires and said core by moving said scrap sheath axially away from said base sheath to form an exposed cable portion;

positioning said base sheath and said scrap sheath at an angle to each other which is other than 0° and 180° and, while said base sheath and said scrap sheath are at said angle, applying a flow of pressurized gas to said exposed portion in a transverse direction thereto, thereby separating said drain wires from said core.

2. The method of claim 1 wherein there are a plurality of two braided cores formed by twisting in a braided direction.

3. The method of claim 1 wherein, after exposing said drain wire and said core, said end is rotated in a second direction, opposite to said first direction, whereby said drain wires are spaced apart radially from said core.

4. The method of claim 3 wherein rotation of said end is effected by force applied to said scrap sheath or said base sheath while the other of said scrap sheath and said base sheath is prevented from rotating.

5. The method of claim 3 wherein said drain wires are formed into an approximate shape of a sphere.

6. The method of claim 1 wherein said positioning comprises bending said exposed cable so that said core projects in an upstream direction toward said flow.

7. The method of claim 2 wherein, after exposing said drain wire and said core, said end is rotated in a second direction, opposite to said first direction, whereby said drain wires are spaced apart radially from said braided cores, said exposed cable being bent so that said cores project toward said flow, rotating said braided cores in an unbraiding direction opposite to said braided direction, whereby said braided cores are separated from each other.

8. The method of claim 4 wherein said force is applied to said scrap sheath, separating said core and said scrap sheath from each other, whereby said core is removed from said scrap sheath.

9. The method of claim 8 wherein said scrap sheath is heated to facilitate removal of said core.

10. The method of claim 8 wherein, while separating said core and said scrap sheath, said drain wires are braided by rotating said scrap sheath.

11. The method of claim 1 wherein said angle is approximately 90°.

* * * * *